Oct. 15, 1946.  T. L. GATKE  2,409,267
BEARING STAVE AND METHOD OF MAKING SAME
Filed Jan. 18, 1943   3 Sheets-Sheet 1

INVENTOR.
Thomas L. Gatke.
BY Cromwell, Greist & Warden
Attys.

Oct. 15, 1946. T. L. GATKE 2,409,267
BEARING STAVE AND METHOD OF MAKING SAME
Filed Jan. 18, 1943 3 Sheets-Sheet 2
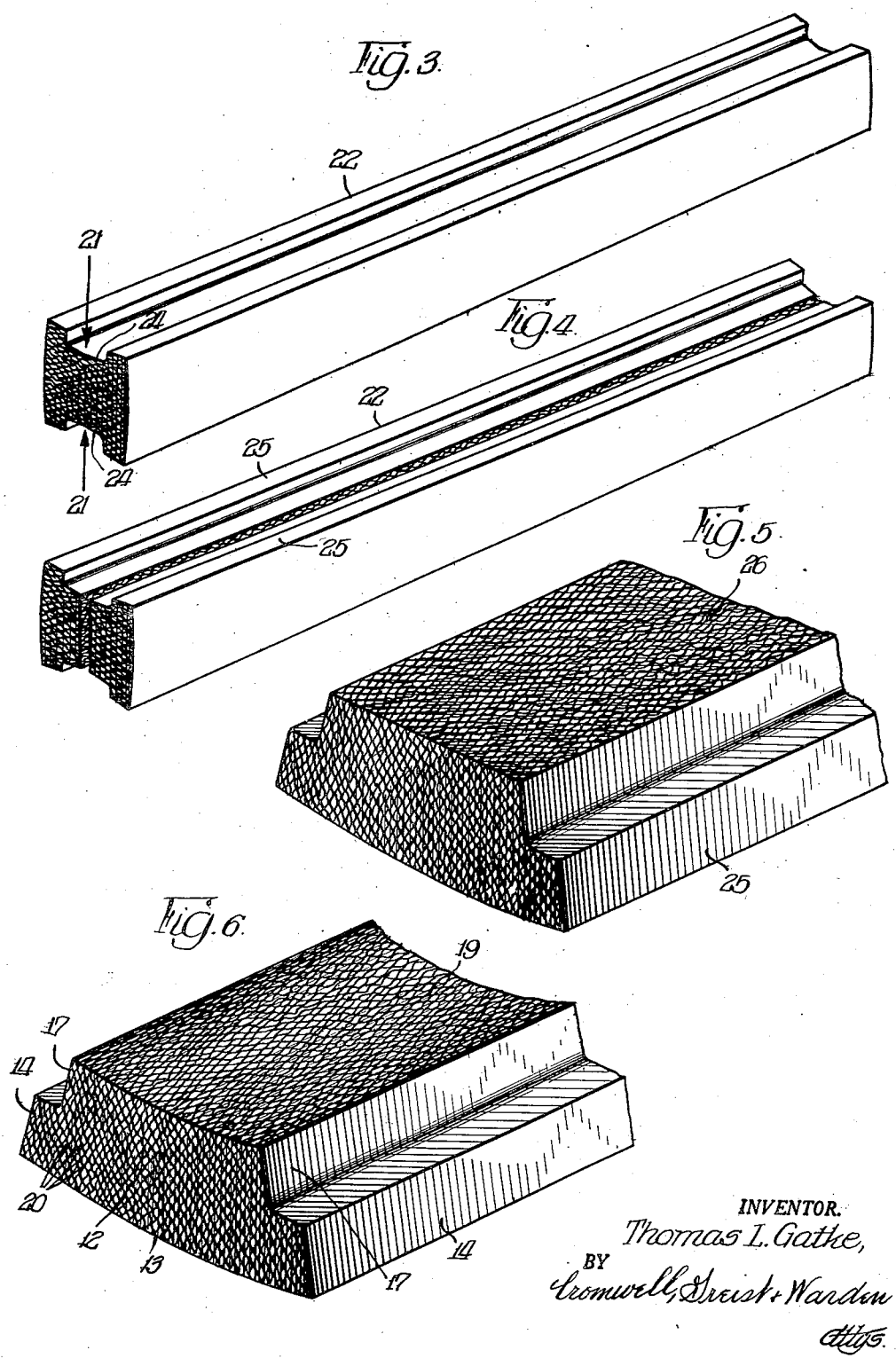
INVENTOR.
Thomas L. Gatke,
BY
Cromwell, Greist + Warden
Attys.

Oct. 15, 1946.　　　　T. L. GATKE　　　　2,409,267
BEARING STAVE AND METHOD OF MAKING SAME
Filed Jan. 18, 1943　　　3 Sheets-Sheet 3
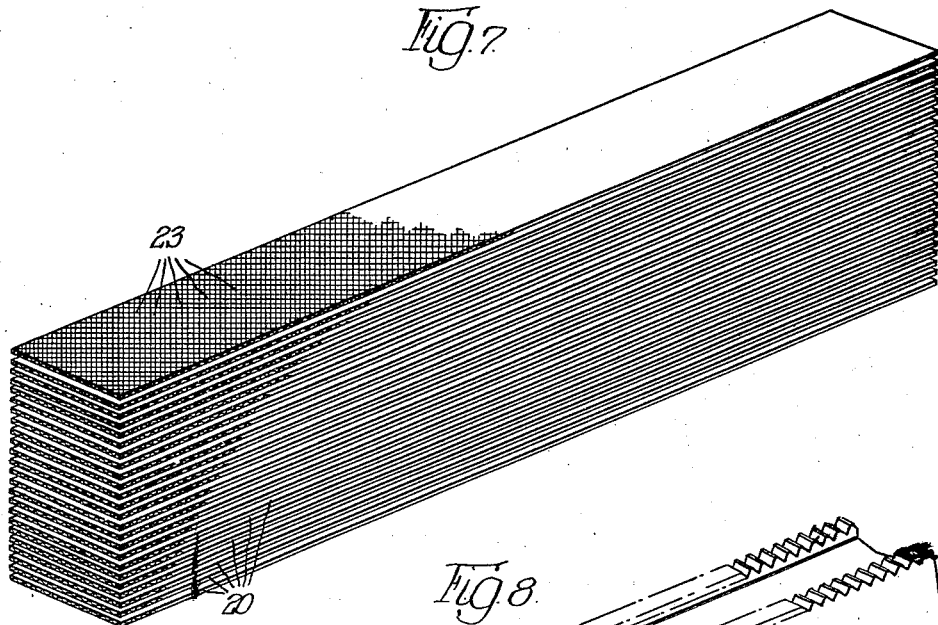
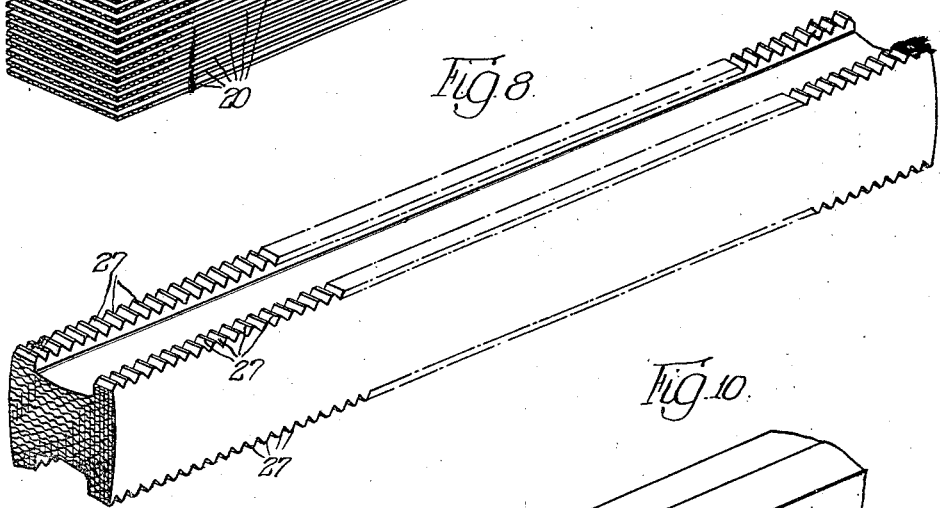
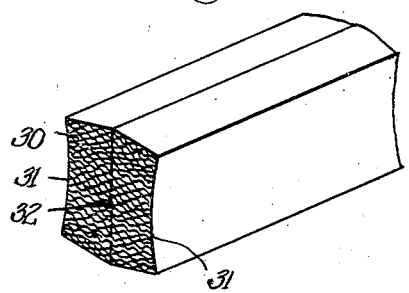
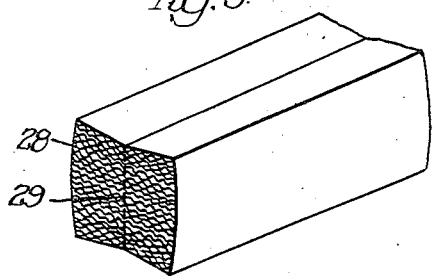
INVENTOR.
Thomas L. Gatke,
BY Patented Oct. 15, 1946

2,409,267

UNITED STATES PATENT OFFICE 2,409,267

BEARING STAVE AND METHOD OF MAKING SAME

Thomas L. Gatke, Oak Park, Ill.

Application January 18, 1943, Serial No. 472,747

7 Claims. (Cl. 18—47.5)

This invention has to do with tubular bearings of the type composed of a number of structurally separate arcuate sections, which sections are known as bearing staves, and is particularly concerned with the production of composition staves in which closely arranged layers of treated fabric are molded under pressure in the staves and are exposed edgewise at the bearing surfaces.

Heretofore in making such staves it has been the practice to cut a number of them from a large slab of laminated stock, cutting the stock first into strips of approximately the same size as the stave and then machining the strips to the required stave cross section. This practice has resulted in the production of staves which are definitely inferior in performance to staves constructed in accordance with the hereinafter described invention. Under the old manufacturing practice the staves have been found to lack sufficient uniformity in the density of their bearing faces, due to unavoidable variations in the texture of the slab at different points throughout its expanse, and they have also been found to swell to an objectionable degree as the result of absorption of water and other matter through the somewhat permeable machined faces.

One of the objects of the invention is to provide an improved method of making bearing staves.

Another object is to provide an improved bearing stave.

While the foregoing statements are indicative in a general way of the nature of the invention, other more specific objects and advantages will be apparent to those skilled in the art upon a full understanding of the improvement.

A preferred embodiment of the invention is presented herein by way of exemplification, but it will of course be appreciated that the invention is capable of incorporation in other structurally modified forms coming equally within the spirit of the invention and the scope of the appended claims.

In the accompanying drawings:

Fig. 3 is a perspective view of the pressure molded composition fabric strip used in producing two of the staves according to the method of the invention;

Fig. 4 is another perspective view of the same strip after having been cut longitudinally down its center to yield two of the staves;

Fig. 5 is a perspective view of one end of one of the resulting staves, before having its inner bearing surface cut to fit the curvature of the shaft;

Fig. 6 is a perspective view of the same end after having its bearing surface cut to fit the shaft;

Fig. 7 is a perspective view of several of the pieces of treated fabric used in forming the molded strip from which two of the staves are produced, showing the pieces of fabric cut on the bias to present a diagonal arrangement of the threads with respect to what ultimately become the wearing surfaces of the staves;

Fig. 8 is a perspective view of a molded two-stave strip which differs from the one shown in Fig. 3 to the extent that the surfaces which ultimately become the meeting edges of the staves are provided with longitudinally interlocking formations; and Figs. 9 and 10 are perspective views of two-stave strips embodying further modifications of the invention.

Figure 1:
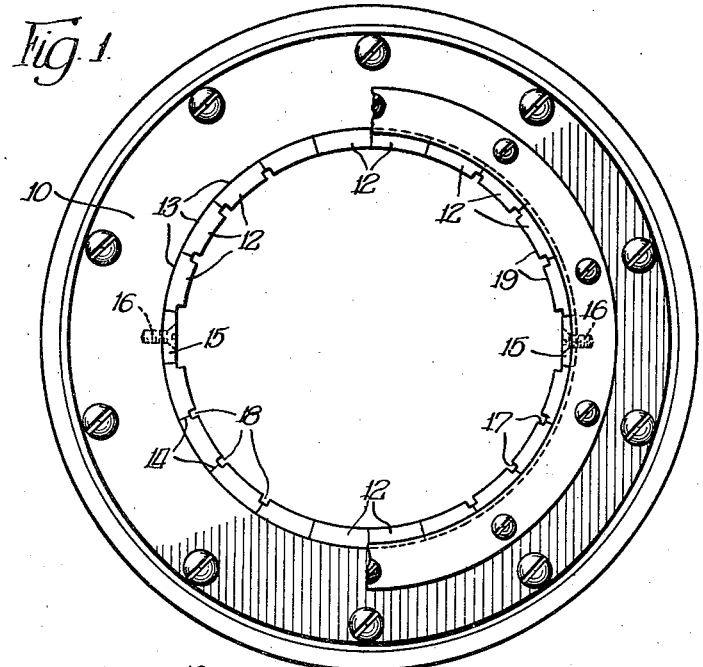
Fig. 1 is an end view of a bearing assembled from a number of staves constructed in accordance with the invention.

Bearings of the type comprising an assemblage of bearing staves are used quite extensively in connection with the propeller shafts of vessels, but can of course be used, and are used, for a great many other purposes. The particular bearing shown in Figs. 1 and 2 of the drawings is a propeller shaft bearing which is positioned in a stern tube bushing 10 about a propeller shaft 11.

The bearing is composed of a large number of bearing staves 12 in which the shaft 11 is rotatably supported. The staves 12 are arranged in sidewise abutment with each other and extend about substantially the entire circumference of the shaft. The outer faces 13 of the staves are arcuately curved to fit the inside of the bushing 10, while the side faces 14 of the staves are disposed in converging planes which intersect at the center of curvature of the outer faces 13 whereby to fit flatly together in a circle when assembled. The staves 12 are held in position in the bushing 10 by two oppositely disposed retaining strips 15 which are secured by screws 16 to the inside of the bushing.

Figure 2:
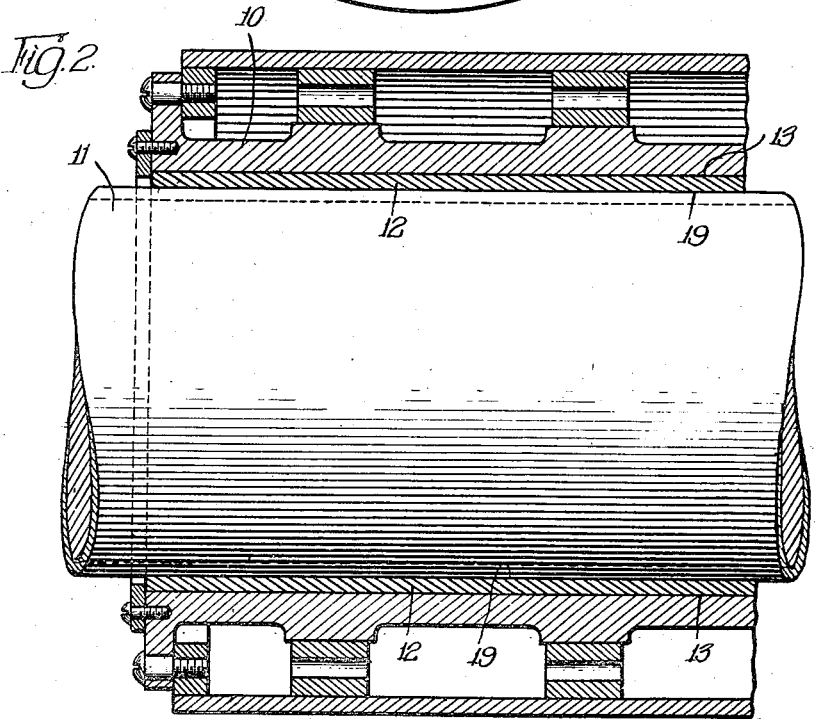
Fig. 2 is a longitudinal section through the bearing, showing the same in position in a bushing about a shaft.

It will be observed in Fig. 1 that some of the staves—namely those forming the sides of the bearing—are provided along the inner edges of their side faces 14 with corner grooves 17 which fit together complementarily to form longitudinally extending channels 18 in the inner faces of the bearing, while the remainder of the staves have no such grooves and present no such channels. The present invention in its broad aspect applies equally to both the grooved and plain types, but for brevity the following explanation will be devoted more particularly to the grooved type.

In installing composition bearing staves in a stern tube bushing or other bearing support the staves after being assembled in the bushing are bored out or otherwise machined to fit the shaft. The boring operation results in the formation of inner bearing faces 19 which are curved on the same radius as the shaft and which are substantially concentric with their outer faces 13. One of the staves is shown in Fig. 5 before the boring operation, and in Fig. 6 after the boring operation.

In making a molded composition fabric bearing strip in accordance with the method of the invention—from which to produce two of the staves—the fabric to be used is first treated by being impregnated with a synthetic resin or other suitable bearing composition. After the filler has hardened the treated fabric is cut into pieces which are approximately twice as wide as one of the staves is thick. These pieces are then stacked together in a large number of closely arranged layers (as shown at 20 in Fig. 7), placed in a mold, and subjected to very substantial heat and pressure for a considerable period, with the pressure applied to the contents of the mold in a direction perpendicular to the fabric laminations (as indicated by the arrows 21 in Fig. 3), resulting in the solidly unified blank 22 shown in Fig. 3. This blank is approximately twice as wide as one of the staves is thick and has finished side edges which are of the same arcuate curvature as the backs of the staves.

During the molding operation the synthetic resin with which the fabric is impregnated softens and flows to an extent sufficient to combine all of the layers solidly and permanently together and at the same time form a more or less impermeable exterior surface about the entire blank.

The pieces of fabric are preferably cut on the bias, as shown in Fig. 7, whereby to place all of the threads 23 at an angle to the bearing faces 19 of the confronting staves and thus present a uniformly textured bearing face on each of the two staves regardless of the depth of wear. Such diagonal arrangement of the threads in the fabric layers also increases the over-all flexibility and resiliency of the stave—the bending moment of the stave in a plane generally parallel to the layers being materially increased without fracture. This results in improved shock-absorbing qualities, rendering the stave capable of absorbing considerable vibration.

The strip-like blank 22—when molded under heat and pressure in the manner above described—is preferably formed with relatively wide but shallow grooves 24 in its upper and lower faces, which grooves ultimately provide the corner grooves 17 in the finished staves. By molding in one blank two confronting staves, all of the faces of both staves, with the exception of their inner bearing faces, will be sealed by the action of the heat and pressure on the bearing composition forced to the surface at such faces.

After the strip 22 has been molded it is cut longitudinally down its center, as shown in Fig. 4, resulting in the production of two unbored but otherwise finished bearing staves 25. All of the faces of these two staves, with the exception of the end faces and inner bearing faces, are sealed off with the composition. The fabric laminations are exposed edgewise only to the end faces and to the flat inner faces 26. The flat inner faces 26, when bored or otherwise cut to fit the shaft, become the bearing faces 19.

After the staves have been produced in this manner they are ready to be cut to the proper length, installed in the bushing or other bearing support, and bored or otherwise cut at their inner faces to fit the shaft. The laterally abutting side faces 14 of the staves, being sealed off during the molding operation, will not grow appreciably through absorption or other causes, and will not deteriorate. The cut-to-shape inner bearing faces 19 have excellent anti-frictional characteristics and will give good results over a long period of time under the most severe operating conditions. Instead of being cut to length after the molding and severing operation, the staves may of course be initially molded to the desired length by forming the two-stave blank in a closed-end mold of that length.

The blank 22 is preferably so molded as to have increased density down through its center, as compared with its sides. This is accomplished by localizing the greatest pressure at the center, top and bottom, with the laminations fanning out to a certain extent away from the center toward the sides.

By increasing the density of the blank 22 down through its center, the bearing faces 19 of the staves cut therefrom will be of increased density, with the layers of fabric radiating away from such faces toward the relatively less dense backs 13, resulting in maximum wear resistance at the faces 19 combined with maximum resiliency in all other portions.

If desired, the staves may be provided along their side faces with longitudinally interlocking formations 27, impressed, as shown in Fig. 8, in the two-stave blank at the time of its formation. While the formations 27 are shown as tooth-shaped, it will of course be appreciated that they may be of any other shape which will permit of a longitudinal interlock between the side faces of adjoining staves.

The staves have been herein described as including a large number of pieces of fabric stacked together, but it is to be understood that the fabric can instead be included in a mascerated form without laminations, or can be omitted entirely and replaced by a quantity of suitable bearing composition.

Each of the staves can be slitted longitudinally if desired to form half-width staves, with or without the edge grooves.

In Fig. 9 a two-stave blank 28 is shown from which two plain, as distinguished from corner-grooved, staves are designed to be cut, the cutting taking place along the heavy dotted line 29. As in the previously described embodiments, the greater part of the forming pressure has been localized in the blank adjacent the center of the same in order to increase the density of the staves in the vicinity of what ultimately becomes their bearing surfaces, with a resultant fanning out of the fabric layers away from said surfaces.

In Fig. 10 another two-stave blank 30 is shown from which two plain staves are designed to be cut. In this particular blank the staves are arranged back-to-back in the blank. The greater part of the forming pressure is preferably localized in the blank adjacent the sides 31 of the latter, which sides ultimately become the bearing surfaces, as distinguished from the backs, of the staves. The backs may be molded initially, if desired, in concave arcuate form. The blank is designed to be cut apart along the heavy dotted line 32. The fabric layers, it will be noted, converge toward the sides 31.

I claim:

1. The method of making molded composition bearing staves of the type having unsealed bearing faces in which layers of treated fabric are arranged in edgewise relation to the bearing face, which consists in molding two of the staves in a single strip-like blank in a press, with the pressure applied to the blank in a direction perpendicular to the layers, and with the greatest pressure localized in the portions of the blank which ultimately become the bearing faces of the staves whereby to increase the density of the composition in those portions and cause the layers to fan out away from such portions, and thereafter cutting the blank longitudinally between its side edges whereby to produce two staves from the one blank having molded and consequently sealed side edges and backs.

2. The method of making molded composition bearing staves of the type having unsealed bearing faces in which layers of treated fabric are arranged in edgewise relation to the bearing face, which consists in first molding under pressure a laminated fabric composition strip of generally rectangular cross section, which strip is approximately twice as wide as one of the staves is thick and has side edges which are of the same arcuate curvature as the backs of the staves, and thereafter cutting the strip longitudinally midway between its curved side edges, whereby to produce from the one strip two unbored but otherwise finished edge grain bearing staves having arcuately molded backs.

3. The method of making molded composition bearing staves of the type having unsealed bearing faces in which layers of treated fabric are arranged in edgewise relation to the bearing face, which consists in first molding under pressure a laminated fabric composition strip of generally rectangular cross section, which strip is approximately twice as wide as one of the staves is thick and has side edges which are of the same arcuate curvature as the backs of the staves, and which strip is provided on its upper and lower surfaces with relatively wide and shallow grooves spaced from the side edges by ledges which are normal to the curvature of the side edges, and thereafter cutting the strip longitudinally midway between its curved side edges, whereby to produce from the one strip two unbored but otherwise finished edge grain bearing staves having arcuately molded backs and radially molded sides, which backs and sides are sealed as distinguished from unsealed surfaces.

4. A molded composition bearing stave having an inner bearing face which is cut to shape after molding to present an unsealed bearing face and having sides and back which are molded to shape and left uncut to present sealed side and back faces.

5. A molded composition bearing stave of the type in which layers of treated fabric are arranged in edgewise relation to the bearing face of the stave, said bearing face of the stave being a cut surface through which the edges of the layers are exposed, and the side faces and back of the stave being molded surfaces within which the layers are sealed.

6. In a molded composition bearing stave of the type in which layers of treated fabric are arranged in edgewise relation to the bearing face, the employment of layers of treated fabric which extend longitudinally of the axis of the bearing face and are cut on the bias, whereby to present all of the threads diagonally to the bearing face throughout the length of the latter.

7. A molded composition bearing stave of the type in which layers of treated fabric are arranged in edgewise relation to the bearing face of the stave, said bearing face being of relatively high density in comparison with other outwardly disposed portions of the stave, and the layers of fabric being more closely compacted at the bearing face than in said other portions, with the layers fanning out away from the bearing face.

THOMAS L. GATKE.